(12) United States Patent
Mauro et al.

(10) Patent No.: US 11,899,577 B2
(45) Date of Patent: Feb. 13, 2024

(54) SELECTIVE GARBAGE COLLECTION

(71) Applicant: Micron Technology, Inc., Boise, ID (US)

(72) Inventors: Antonio Mauro, Giugliano in Campania (IT); Luigi Costanzo, Trentola Ducenta (IT); Nicola Colella, Capodrise (IT)

(73) Assignee: Micron Technology, Inc., Boise, ID (US)

( * ) Notice: Subject to any disclaimer, the term of this patent is extended or adjusted under 35 U.S.C. 154(b) by 482 days.

(21) Appl. No.: 17/103,538

(22) Filed: Nov. 24, 2020

(65) Prior Publication Data

US 2022/0164283 A1 May 26, 2022

(51) Int. Cl.
*G06F 12/02* (2006.01)
*G06F 1/3212* (2019.01)

(52) U.S. Cl.
CPC ........ *G06F 12/0253* (2013.01); *G06F 1/3212* (2013.01)

(58) Field of Classification Search
CPC .. G06F 12/0253; G06F 1/3212; G06F 1/3275; G06F 2212/7205; G06F 3/0604; G06F 3/0625
USPC .................................................. 707/816, 813
See application file for complete search history.

(56) References Cited

U.S. PATENT DOCUMENTS

| | | | | |
|---|---|---|---|---|
| 6,025,698 | A * | 2/2000 | Kim | H01M 10/44 320/152 |
| 6,631,520 | B1 * | 10/2003 | Theron | G06F 8/65 712/E9.007 |
| 7,774,390 | B2 * | 8/2010 | Shin | G06F 12/0246 707/819 |
| 7,907,060 | B2 * | 3/2011 | Reams | H04N 21/42204 324/426 |
| 9,128,820 | B1 * | 9/2015 | Malina | G06F 12/0238 |
| 10,379,874 | B1 * | 8/2019 | Venkatasamy | G06F 1/3212 |
| 2002/0175654 | A1 * | 11/2002 | Takano | H02J 7/0048 320/115 |
| 2004/0232892 | A1 * | 11/2004 | Aradachi | H02J 7/0068 320/150 |

(Continued)

FOREIGN PATENT DOCUMENTS

| | | | | |
|---|---|---|---|---|
| CN | 104541529 | B * | 8/2016 | |
| CN | 110890123 | A * | 3/2020 | ........... G01R 31/367 |

(Continued)

OTHER PUBLICATIONS

Chinese Patent Office, "Office Action," issued in connection with Chinese Patent Application No. 202111392428.1 dated Aug. 29, 2023 (40 pages; 20 pages Original & 20 pages machine translation).

*Primary Examiner* — Phuong Thao Cao
(74) *Attorney, Agent, or Firm* — Holland & Hart LLP

(57) ABSTRACT

Methods, systems, and devices for selective garbage collection are described. A host system may determine that a battery level is below a threshold or determine whether a power parameter of a memory system that includes a memory device satisfies a criterion. The host system may set a value of a flag. The memory system may perform an access operation and identify the value of the flag. The memory system may determine whether performing a garbage collection procedure is permitted based on identifying the value of the flag.

25 Claims, 8 Drawing Sheets

(56) References Cited

U.S. PATENT DOCUMENTS

| | | | |
|---|---|---|---|
| 2007/0174579 A1* | 7/2007 | Shin | G06F 12/0246 711/170 |
| 2007/0274134 A1* | 11/2007 | Roohparvar | G11C 16/16 365/185.33 |
| 2010/0293275 A1* | 11/2010 | Rezaiifar | H04L 47/24 709/225 |
| 2012/0206086 A1* | 8/2012 | Yagi | H02J 7/0071 320/155 |
| 2013/0073797 A1* | 3/2013 | Chowdhury | G11C 16/3418 711/E12.008 |
| 2014/0380075 A1* | 12/2014 | Pulapaka | G06F 1/3206 713/323 |
| 2015/0212918 A1* | 7/2015 | Cai | G06F 9/44 719/318 |
| 2017/0075610 A1* | 3/2017 | Choi | G06F 1/3275 |
| 2018/0113650 A1* | 4/2018 | Byun | G06F 3/0679 |
| 2018/0129416 A1* | 5/2018 | Kim | G06F 3/0679 |
| 2018/0129604 A1* | 5/2018 | Kim | G06F 12/0866 |
| 2018/0307496 A1* | 10/2018 | Ke | G06F 1/30 |
| 2018/0336146 A1* | 11/2018 | Blodgett | G06F 1/188 |
| 2019/0179685 A1* | 6/2019 | Ki | G06F 12/0246 |
| 2020/0042230 A1* | 2/2020 | Li | G06F 3/0655 |
| 2020/0065029 A1* | 2/2020 | Kim | G06F 3/0625 |
| 2020/0081065 A1* | 3/2020 | Byun | G06F 1/3212 |
| 2020/0117534 A1* | 4/2020 | Yurzola | G06F 3/0683 |
| 2020/0278735 A1* | 9/2020 | Ansari | G06F 1/3265 |
| 2020/0310966 A1* | 10/2020 | Lee | G06F 12/0246 |
| 2021/0056019 A1* | 2/2021 | Limaye | G06F 1/3212 |

FOREIGN PATENT DOCUMENTS

| | | | | |
|---|---|---|---|---|
| CN | 111864844 A | * | 10/2020 | H02J 7/0016 |
| EP | 1818829 A2 | * | 8/2007 | |
| GB | 2529857 A | * | 3/2016 | G01R 31/3689 |
| JP | 2004032967 A | * | 1/2004 | H02J 7/0016 |
| JP | 2004178417 A | * | 6/2004 | |
| JP | 2015009581 A | * | 1/2015 | |
| JP | 2017007496 A | * | 1/2017 | |
| JP | 2019035785 A | * | 3/2019 | |
| KR | 20190032735 A | * | 3/2019 | |
| KR | 20200029810 A | * | 3/2020 | |
| WO | 2009/156556 A1 | | 12/2009 | |

\* cited by examiner

SELECTIVE GARBAGE COLLECTION

BACKGROUND

The following relates generally to one or more systems for memory and more specifically to selective garbage collection.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D Xpoint), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
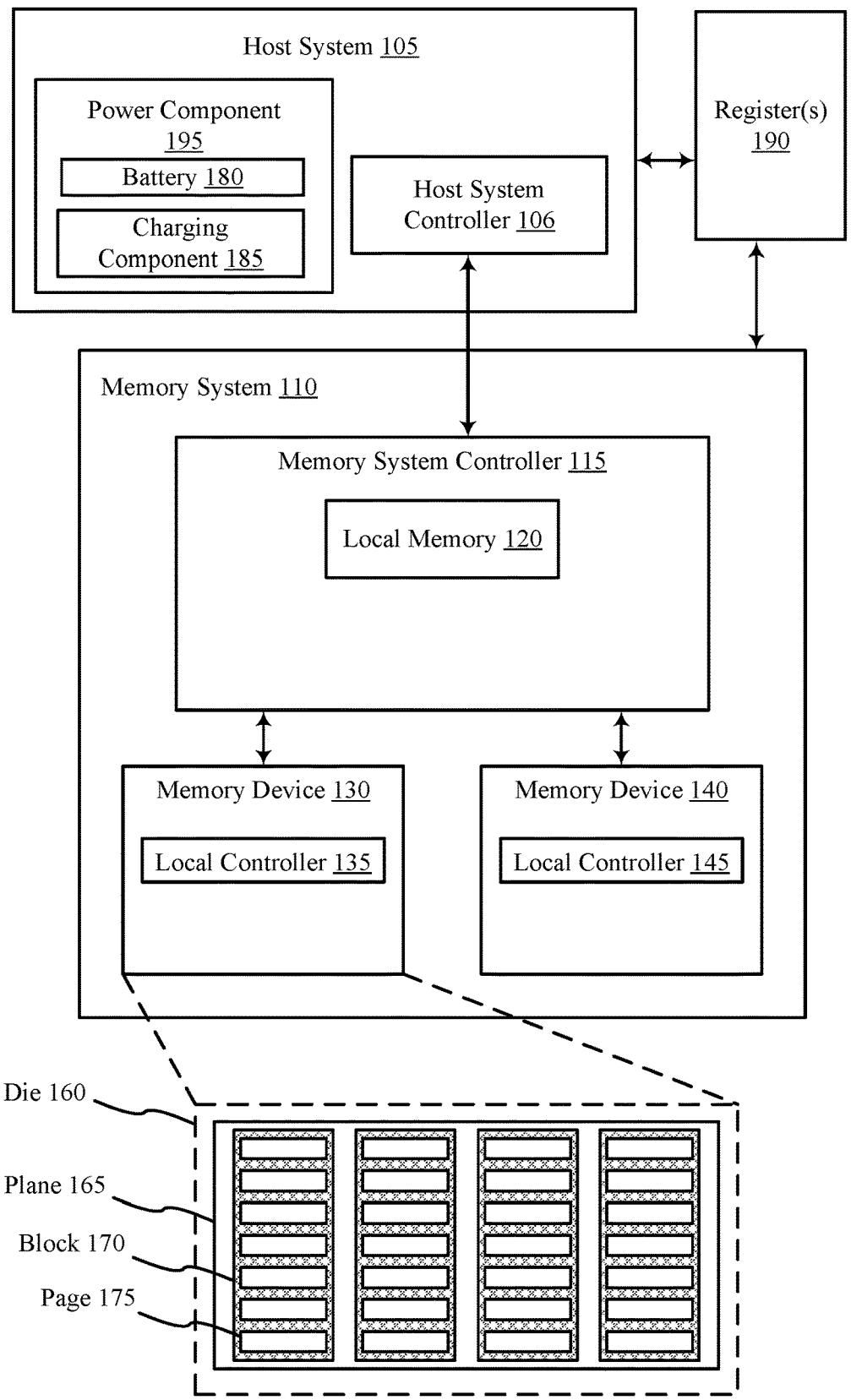
FIG. 1 illustrates an example of a system that supports selective garbage collection in accordance with examples as disclosed herein.

Some memory systems may perform one or more management operations (e.g., garbage collection operations) to facilitate performance of the memory system. Such procedures may result in an increased amount of data being written or read in the memory system. For example, some data written as part of an access operation may be host-data associated with the command and some data written as part of the access operation may be memory-data associated with the memory management operation. Such techniques may result in the memory system experiencing increased power consumption and a performance loss when performing a garbage collection operation, which may increase the latency for other operations related to the host system. By performing garbage collection operations, the memory system may use an increased amount of power thereby decreasing the overall performance of the memory system and resulting in the host system experiencing impaired read, write, and erase speeds. For some system that are battery-powered the additional power consumption may not be desirable during some circumstances. Techniques to determine whether to perform garbage collection operations based on power parameters associated with the power supply of the system are described.

Aspects of the present disclosure address the above and other deficiencies by having a memory system that includes a selective garbage collection operation. The host system may determine a power parameter associated with the system. For example, the host system may determine a battery level of the system, whether the battery of the system is currently being charged (e.g., a charge status), whether the system is coupled with a power source, or a combination thereof. The host system may indicate, to the memory system, the determined battery level and determined power parameter by setting a value of a flag. In such cases, the memory system may identify the value of the flag and determine whether performing the garbage collection operation on the memory system is permitted. In some cases, the memory system may suspend the garbage collection operation if the value of the flag indicates that the battery level is below the threshold and the battery is failing to currently be charging. In other examples, the memory system may perform the garbage collection operation if the value of the flag indicates that the battery level is above the threshold, the battery is fully charged, or the battery is currently charging.

In such cases, the garbage collection operation may be performed when the battery level is above the threshold and the battery is fully charging or currently charging. By setting a flag to indicate whether the garbage collection operation is permitted, the overall performance of the memory system may increase. For example, performing a selective garbage collection operation may improve the overall efficiency of the memory system, which may result in the system experiencing improved battery life and the memory system experiencing improved read, write, and erase speeds, reduced power consumption, improved processing times, and the like.

Features of the disclosure are initially described in the context of a system as described with reference to FIG. 1. Features of the disclosure are described in the context a system and flow diagrams as described with reference to FIGS. 2-4. These and other features of the disclosure are further illustrated by and described with reference to apparatus diagrams and flowcharts that relate to selective garbage collection as described with reference to FIGS. 5-8.

FIG. 1 illustrates an example of a system 100 that supports selective garbage collection in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may include a power component 195. The power component may include a battery 180, a charging component 185, or other power circuitry. In some examples, the battery 180 may be configured to supply power to the components of the system 100, including the memory system. The charging component 185 may be configured to charge the battery 180 when a portion of the system 100 is coupled with a power source (e.g., an outlet). In some cases, the power component 195 may determine whether the battery level of the battery 180 is above or below a threshold. In some cases, the power component 195 may determine whether the battery 180 of the system 100 is currently charging, fully charged, or failing to currently be charging.

The host system 105 may set a value of a flag to indicate whether a power parameter of a system satisfies a criterion. In some cases, the flag may be stored in a register 190 that is accessible by the host system 105 and the memory system 110. The register 190 may be coupled with the host system 105 and the memory system 110. In such cases, the host system 105 may store the value of the flag in the register 190, and the memory system 110 may read the value of the flag from the register 190 to identify the value. In some examples, the register 190 may include one or more registers. For example, a second flag may be stored in a second register within the register 190 where the second flag may indicate whether the memory system is permitted to perform the garbage collection procedure. In such case, the second register may store a flag that indicates an authorization of the garbage collection procedure during an idle time. In some cases, the host system 105 may have write-permission access to the register 190 and the memory system 110 may have read-only permission to the register 190.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a serial advanced technology attachment (SATA) interface, a UFS interface, an eMMC interface, a peripheral component interconnect express (PCIe) interface, USB interface, Fiber Channel, Small Computer System Interface (SCSI), Serial Attached SCSI (SAS), Double Data Rate (DDR), a dual in-line memory module (DIMM) interface (e.g., DIMM socket interface that supports DDR), Open NAND Flash Interface (ONFI), Low Power Double Data Rate (LPDDR). In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 or memory device 140 included in the memory system 110, or via a respective physical host interface for each type of memory device 130 or memory device 140 included in the memory system 110.

Memory system 110 may include a memory system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells). Although one memory device 130 and one memory device 140 are shown in the example of FIG. 1, it is to be understood that memory system 110 may include any quantity of memory devices 130 and memory devices 140, and that, in some cases, memory system 110 may lack either a memory device 130 or a memory device 140.

The memory system controller 115 may be coupled with and communicate with the host system 105 (e.g., via the physical host interface). The memory system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

The memory system controller 115 may be configured for other operations associated with the memory devices 130 or memory devices 140. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored to the local memory 120 when read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the memory system controller 115. In general, one or more functions ascribed herein to the memory system controller 115 may in some cases instead be performed by the host system 105, a local controller 135, or a local controller 145, or any combination thereof.

The memory system 110 may perform an access operation and identify the value of the flag. The flag may indicate whether the power parameter of the system 100 satisfies the criterion. The memory system 110 may determine whether performing a garbage collection procedure on the memory system 110 is permitted based on the value of the flag. In such cases, the memory system 110 may suspend or perform the garbage collection procedure based on the value of the flag. For example, the memory system 110 may suspend the garbage collection procedure based on the flag indicating that a level of the battery 180 is below a threshold or is failing to currently be charging or both. In other examples, the memory system 110 may perform the garbage collection procedure based on the flag indicating that the level of the battery 180 is above the threshold or that the battery 180 is currently charging.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). The memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, a memory system controller 115, a local controller 135, or a local controller 145 may perform operations (e.g., as part of one or more media management algorithms) for a memory device 130 or a memory device 140, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the number of blocks 170 that have been erased may be increased such that more blocks 170 are available to store subsequent data (e.g., data subsequently received from the host system 105).

The system 100 may include any quantity of non-transitory computer readable media that support selective garbage collection. For example, the host system 105, the memory system controller 115, a memory device 130, or a memory device 140 may include or otherwise may access one or more non-transitory computer readable media storing instructions (e.g., firmware) for performing the functions ascribed herein to the host system 105, memory system controller 115, memory device 130, or memory device 140. For example, such instructions, when executed by the host system 105 (e.g., by the host system controller 106), by the memory system controller 115, by a memory device 130 (e.g., by a local controller 135), or by a memory device 140 (e.g., by a local controller 145), may cause the host system 105, memory system controller 115, memory device 130, or memory device 140 to perform associated functions as described herein.

Figure 2:
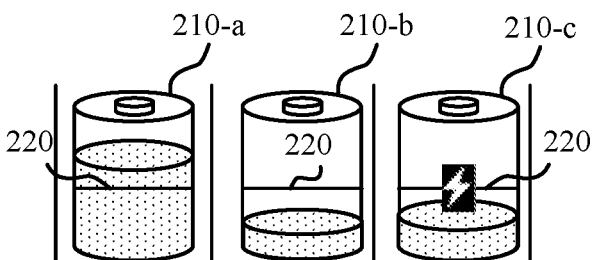
FIG. 2 illustrates an example of a system that supports selective garbage collection in accordance with examples as disclosed herein.

FIG. 2 illustrates an example of a system 200 that supports selective garbage collection in accordance with examples as disclosed herein. The system 200 may include a table 205 where the table 205 illustrates a logic stored in a register that the memory system uses to determine whether the garbage collection procedure is permitted.

In some systems, a garbage collection procedure may be performed based on a single parameter (e.g., garbage collection parameter). In such cases, the memory system may identify a value of a flag to enable or disable the garbage collection procedure. The memory system may determine whether the memory system includes the capability to perform the garbage collection procedure during an idle period and perform the garbage collection procedure based on the determination. In some cases, the memory system may perform the garbage collection procedure. In such cases, the garbage collection procedure may be memory device driven. In some cases, the memory system may notify the host system of the garbage collection procedure.

Some systems that include memory systems may have power constraints. For example, some mobile computing devices may be battery powered. Performing garbage collection procedures or other memory management operations may be used to maintain the performance of the memory system over a longer duration, but performing such operations may consume power. When the system is in a power-critical state (e.g., a low battery level and not connected to another power source), it may be advantageous to delay performing garbage collection procedures or other memory management operations to conserve power. Techniques are described to enable or disable memory management operations based on a power parameter of the system.

In some cases, the host system may set a flag accessible by the memory system to indicate whether a power parameter of the larger system (e.g., battery level, charge status, or both) satisfies a criterion. For example, the host system may determine that the battery level is above the threshold. In such cases, the memory system may be permitted to schedule and perform memory management procedures such as garbage collection procedures. In some examples, the host system may determine that a battery level is below a threshold. In such cases, the memory system may suspend performing memory management procedures such as garbage collection procedures.

The memory system may suspend the garbage collection procedure to reduce additional power consumption and continue to suspend performing garbage collection procedures until the host system resets the flag. After the battery is charged above the threshold, the host system may reset the flag to indicate that the memory system may perform the garbage collection procedures. Selectively disabling garbage collection procedures may improve the battery-life of the larger system.

The table 205 may include examples of how different flags in registers (e.g., the GC parameter 225 and the power parameter 230) are interpreted to enable or disable the memory system from performing memory management procedures such as garbage collection procedures. The table 205 illustrates different scenarios involving the power of the system. In a first example, the battery 210-a may be at a first level that exceeds the threshold 220. In a second example, the battery 210-b may be at a second level that is below the threshold 220. In a third example, the battery 210-c may be at a third level that is below the threshold 220 and the battery 210-c is currently being charged. The table 205 may also include an indication of a GC parameter 225, a power parameter 230, and an indication of whether the memory 235 is permitted to perform memory management operations (e.g., garbage collection operations).

The GC parameter 225 may be configured to indicate whether the host system has permitted the memory system to perform garbage collection procedures (or other memory management procedures). The host system may set a value of the GC parameter 225 (stored in a register) to a first value (e.g., 1) to indicate that garbage collection procedures are permitted or may set a value of the GC parameter 225 (stored in a register) to a second value (e.g., 0) to indicate that garbage collection procedures are not permitted.

The power parameter 230 may be configured to indicate a power parameter or a power condition of the system. The memory system may use the power parameter 230 and GC parameter 225 to determine whether it is permitted to perform garbage collection procedures (or other memory management procedures). The host system may set a value of the power parameter 230 (stored in a register) to a first value (e.g., 1) to indicate that the power condition of the system is such that garbage collection procedures are not permitted or may set a value of the power parameter 230 (stored in a register) to a second value (e.g., 0) to indicate that the power condition of the system is such that garbage collection procedures are permitted. The host system may set a value of the power parameter 230 to either a first value (e.g., "1") or a second value (e.g., "0") depending on the battery level, the charge status, or both. For example, the host system may determine the battery level and set a flag (e.g., value of the power parameter 230) in a first register based on the battery level. For example, the host system may determine that the battery level of the first battery 210-a is above the threshold 220 and set the value of the power parameter 230 to be the second value (e.g., "0"). The host system may determine that the battery level of the second battery 210-b is below the threshold 220 and set the value of the power parameter 230 to be the first value (e.g., "1"). The host system may determine that the battery level of the third battery 210-c is above the threshold 220 and set the value of the power parameter 230 to be the second value (e.g., "0").

In some examples, the host system may determine the charge status and set a flag (e.g., value of the power parameter 230) in the first register based on the charge status. For example, the host system may determine that the charge status of the first battery 210-a is fully charged and not currently charging. In such cases, the host system may set the value of the power parameter 230 to be the second value. The host system may determine that the second battery 210-b is not fully charged and not currently charging. In such cases, the host system may set the value of the power parameter 230 to be the first value. The host system may determine that the third battery 210-c is not fully charged and currently charging. In such cases, the host system may set the value of the power parameter 230 to be the second value.

The memory system may read the first register to identify the value of the power parameter 230. For example, the memory system may identify that the value of the power parameter 230 set for the first battery 210-a is the second value. In such cases, the memory system may perform the garbage collection procedure (e.g., "GC ON") for the memory 235. In such cases, as the memory system identifies garbage collection procedure that may occur, the memory system may implement operations to make the procedure to occur as part of the course of operation. In some examples, the memory system may identify that the value of the power parameter 230 set for the second battery 210-b is the first value. In such cases, the memory system may suspend the garbage collection procedure (e.g., "GC OFF") for the memory 235. In such cases, as the memory system refrains from performing garbage collection procedures. In other examples, the memory system may identify that the value of the power parameter 230 set for the third battery 210-c is the second value. In such cases, the memory system may perform the garbage collection procedure (e.g., "GC ON") for the memory 235. The GC parameter 225 may be set to suspend the garbage collection procedure (e.g., "GC OFF") for the memory 235 regardless of the value of the power parameter 230.

The memory system may include a second register where the memory system may implement the logic included in the table 205 from the first register and the second register. The second register may include a second flag that indicates whether the garbage collection procedure is activated or deactivated by the host system. The GC parameter 225 may be an example of the second flag included in the second register. For example, the host system may set the value of the GC parameter 225 to be the first value.

The value of the GC parameter 225 and the power parameter 230 may indicate whether the memory 235 may perform or suspend the garbage collection procedure. For example, the memory system may identify that the GC parameter 225 is the first value and the power parameter 230 is the second value for the first battery 210-a. In such case, the memory system may perform the garbage collection procedure for the memory 235. In some examples, the memory system may identify that the GC parameter 225 is the first value and the power parameter 230 is the first value for the second battery 210-b. In such cases, the memory system may suspend the garbage collection procedure for the memory 235. In other examples, the memory system may identify that the GC parameter 225 is the first value and the power parameter 230 is the second value for the third battery 210-c. In such cases, the memory system may perform the garbage collection procedure for the memory 235.

In some cases, the power parameter 230 may be an example of the low-power mode indicator. In such cases, the power parameter 230 may indicate whether the memory system is operating in the low-power mode. For example, the memory system may determine that the second battery 210-b may operate in the low-power mode (e.g., power safe mode on) based on determining that the battery level is below the threshold 220 and the battery is not currently charging. In such cases, the host system may set the power parameter 230 to the first value to indicate that the memory system is operating in the low-power mode. The memory system may suspend the garbage collection procedure based on determining that the memory system is operating in the low-power mode.

In some examples, the memory system may determine that the first battery 210-a is operating in the high-power mode (e.g., power safe mode off) based on determining that the battery level is above the threshold 220 or that the battery is currently being charged. In some examples, the memory system may determine that the first battery 210-a or the third battery 210-c is operating in the high-power mode based on determining that the battery level is above the threshold 220 or the battery is currently charging. In such cases, the host system may set the power parameter 230 to the second value to indicate that the memory system is operating in the high-power mode. The memory system may perform the garbage collection procedure based on determining that the memory system is operating in the high-power mode.

Figure 3:
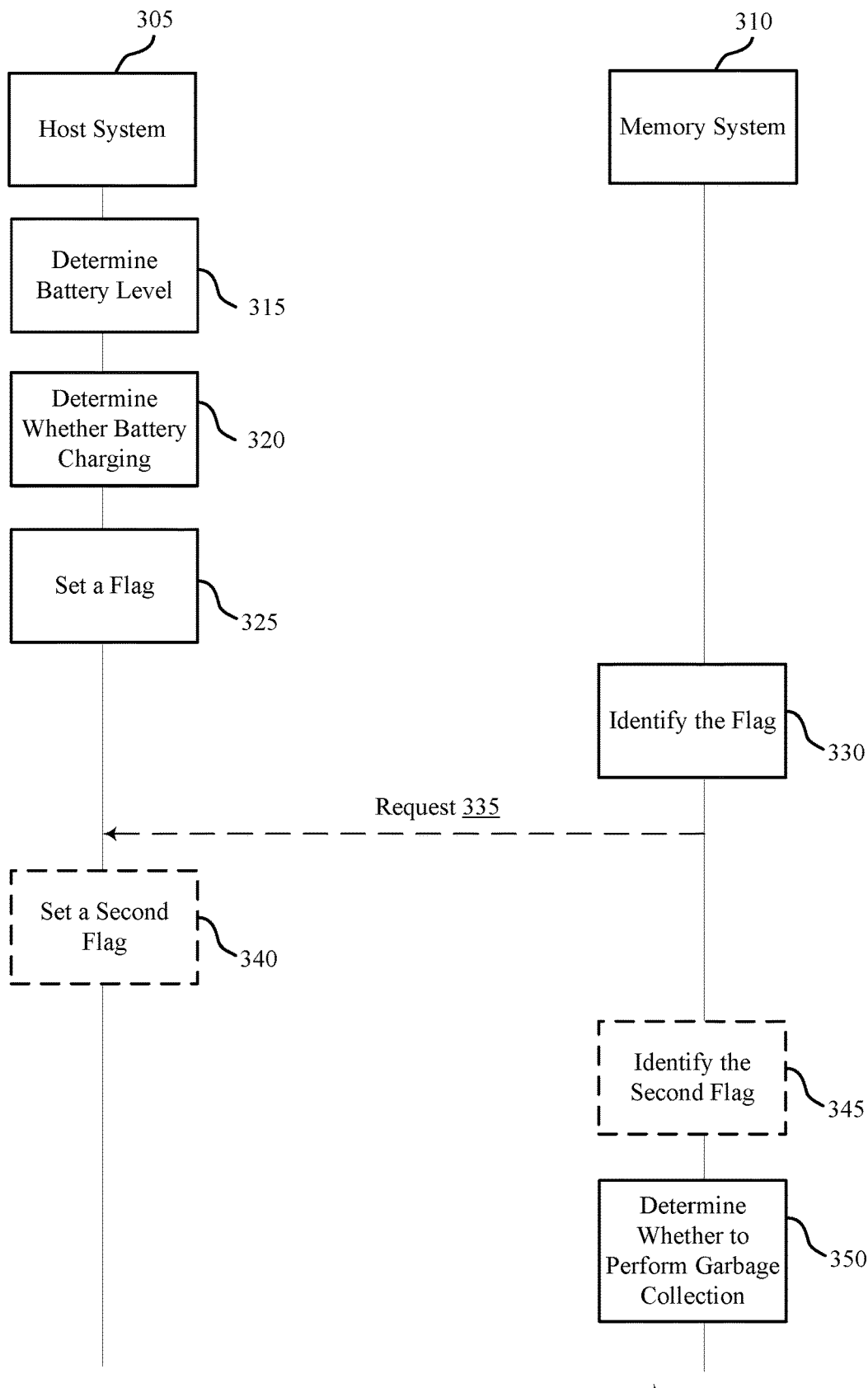
FIG. 3 illustrates an example of a flow diagram that supports selective garbage collection in accordance with examples as disclosed herein.

FIG. 3 illustrates an example of a flow diagram 300 that supports selective garbage collection in accordance with examples as disclosed herein. Flow diagram 300 may include host system 305 and memory system 310, which may be respective examples of a host system and memory system as described in reference to FIGS. 1 and 2. Alternative examples of the following may be implemented, where some steps are performed in a different order or not at all. Some steps may additionally include additional features not mentioned below.

Aspects of the flow diagram 300 may be implemented by a controller, among other components. Additionally or alternatively, aspects of the flow diagram 300 may be implemented as instructions stored in memory (e.g., firmware stored in a memory coupled with memory system 110). For example, the instructions, when executed by a controller (e.g., the device memory controller 155), may cause the controller to perform the operations of the flow diagram 300. The flow diagram 300 illustrates techniques where the host system 305 may set a power indicator (e.g., a value of a flag), and the memory system 310 may use the power indicator to determine whether a garbage collection procedure is permitted.

At 315, a battery level of the system that includes the memory system may be determined. For example, the host system 305 may determine the level of the battery. The host system 305 may determine that the battery level is above or below a threshold.

At 320, whether a battery is charging or whether a system is coupled with a power source is determined. For example, the host system 305 may determine whether a battery is charging or whether a system is coupled with a power source.

In some cases, a power parameter may be determined. For example, the host system 305 may determine the power parameter. The host system 305 may determine whether the power parameter of the memory system that includes the memory system 310 satisfies a criterion based on determining that the battery level is below the threshold or determine whether a battery is charging or whether a system is coupled with a power source or both. The power parameter may be an example of a charge status. The charge status may include whether the battery is charged above a threshold, currently charging, or failing to currently charge. In some cases, determining whether the parameter satisfies the criterion is based on determining whether the battery is currently charging. If the battery level is below the threshold and the battery is not charging, the host system 305 may determine that the power parameter satisfies the criterion and thereby determine that memory management procedures are not permitted to be performed (e.g., the memory system is to operate in a power conservation mode). In other examples, if the battery level is above the threshold or the battery is charging the host system 305 may determine that the battery level is above the threshold. In such cases, the host system 305 may determine that the battery is currently charging or fully charged. If the battery level is above the threshold and the battery is fully charged or currently charging, the host system 305 may determine that the power parameter fails to satisfy the criterion and thereby determine that the power safe mode is off.

At 325, a flag may be set. For example, the host system 305 may set a value of the flag. The flag may be an example of a UFS/eMMC flag that is linked to the battery level. In such cases, the flag may indicate whether the power parameter of the memory system satisfies the criterion. The host system 305 may store the value of the flag in a register associated with the memory system. For example, the host system 305 may store the flag by a first register associated with the memory system. In some cases, the host system 305 may set the value of the flag to a first value (e.g., "1") that indicates the power parameter satisfies the criterion or set the value of the flag to a second value (e.g., "0") that indicates the power parameter fails to satisfy the criterion. The flag may be rest by the host system 305 when the battery becomes charged above the threshold.

At 330, the flag may be identified. For example, the memory system 310 may perform an access operation and identify the value of the flag set by the host system 305. The memory system 310 may identify whether the value of the flag is the first value (e.g., "1") or the second value (e.g., "0"). The flag may indicate whether a battery of the memory system is not charging and below a threshold (e.g., the battery may use a recharge operation). In such cases, the memory system 310 may identify that the value of the flag is the first value. In some cases, the flag may indicate whether the battery of the memory system is currently charging of fully charged and above a threshold. In such cases, the memory system 310 may identify that the value of the flag is the second value.

In some cases, the memory system 310 may read a register associated with the memory system 310 based on performing the access operation and identifying the value of the flag. In some examples, the memory system 310 may determine that the flag indicates the power parameter satisfies the criterion and that the garbage collection procedure is restricted. In some cases, the flag may indicate that the memory system 310 is performing operations outside an idle period. In such cases, the memory system 310 may suspend the garbage collection procedure to prevent reducing the power consumption.

The memory system 310 may transmit, to the host system 305, a request 335 to perform the garbage collection procedure based on determining that the flag indicates the power parameter satisfies the criterion and that garbage collection procedures are restricted. In some cases, the memory system 310 may need to perform one or more garbage collection procedures to continue normal operations, even when conserving power. The host system 305 may receive the request 335 where the request 335 may include a request to perform a garbage collection procedure during at least a portion of an idle period. In such cases, the memory system 310 may identify the idle period to perform the garbage collection procedure. For example, the memory system 310 may identify the idle period, determine that the power parameter satisfies the criterion (e.g., the value of the flag is "1"), and determine that garbage collection procedures are restricted. The memory system may override the determination that the garbage collection procedures are restricted and perform the garbage collection procedure during the idle period. During the idle period, the memory system 310 may execute the garbage collection procedure while refraining from servicing the host system 305. In such cases, the garbage collection procedure may be memory device driven.

In some cases, the host system 305 may transmit information permitting the garbage collection procedure based on receiving the request 335. The host system 305 may determine a priority of the request 335. For example, the host system 305 may determine whether a priority of the request 335 satisfies a second threshold based on receiving the request 335. In such cases, transmitting the information is based on determining whether the priority of the request 335 satisfies the second threshold. The priority of the request 335 may be based on a priority of the memory system 310 sending the request 335, a time associated with the receipt of the request 335, an indication of other operations in queue for the memory system 310, or a combination thereof.

At 340, a second flag may be set. For example, the host system 305 may determine whether the memory system is permitted to perform garbage collection procedures. The host system 305 may set a second value of the second flag (e.g., GC parameter described with reference to FIG. 2) that indicates whether the memory system is permitted to perform the garbage collection procedures. The host system 305 may store the second value of the second flag in a register associated with the memory system. For example, the host system 305 may store the second flag by a second register associated with the memory system. The second flag may be an example of a flag that activates the garbage collection procedure.

In some cases, the host system 305 may set the second value of the second flag to a first value (e.g., "1") that indicates that the memory system 310 is not permitted to perform garbage collection procedures or set the second value of the second flag to a second value (e.g., "0") that indicates that the memory system 310 is permitted to perform garbage collection procedures.

At 345, a second flag may be identified. In such cases, the memory system 310 may identify a second value of the second flag that indicates whether the memory system 310 is permitted to perform garbage collection procedures. For example, the memory system 310 may identify whether the second value of the second flag is the first value of the second value.

At 350, a determination may be made whether performing a garbage collection procedure on the memory system 310 is permitted. For example, the memory system 310 may determine whether performing the garbage collection procedure on the memory system 310 is permitted. The memory system 310 may determine whether performing the garbage collection procedure on the memory system 310 is permitted based on the value of the flag and the second value of the second flag. In some examples, the memory system 310 may suspend the garbage collection procedure based on determining that the flag indicates that the battery level of the memory system is below a threshold. In some cases, the memory system 310 may suspend the garbage collection procedure based on the battery level being below the threshold and the battery failing to currently be charging. In such cases, the value of the flag may be the first value. The second value of the second flag may be the first value. The memory system 310 may suspend the garbage collection procedure based on the value of the flag being the first value, the second value of the second flag being the first value, or both.

In other examples, the memory system 310 may perform the garbage collection procedure based on determining that the flag indicates that the battery level of the memory system is above the threshold. The memory system 310 may perform the garbage collection procedure based on the battery level being above the threshold and the battery currently charging or fully charged. In such cases, the value of the flag may be the second value. The second value of the second flag may be the first value. The memory system 310 may perform the garbage collection procedure based on the value of the flag being the second value and the second value of the second flag being the first value.

Figure 4:
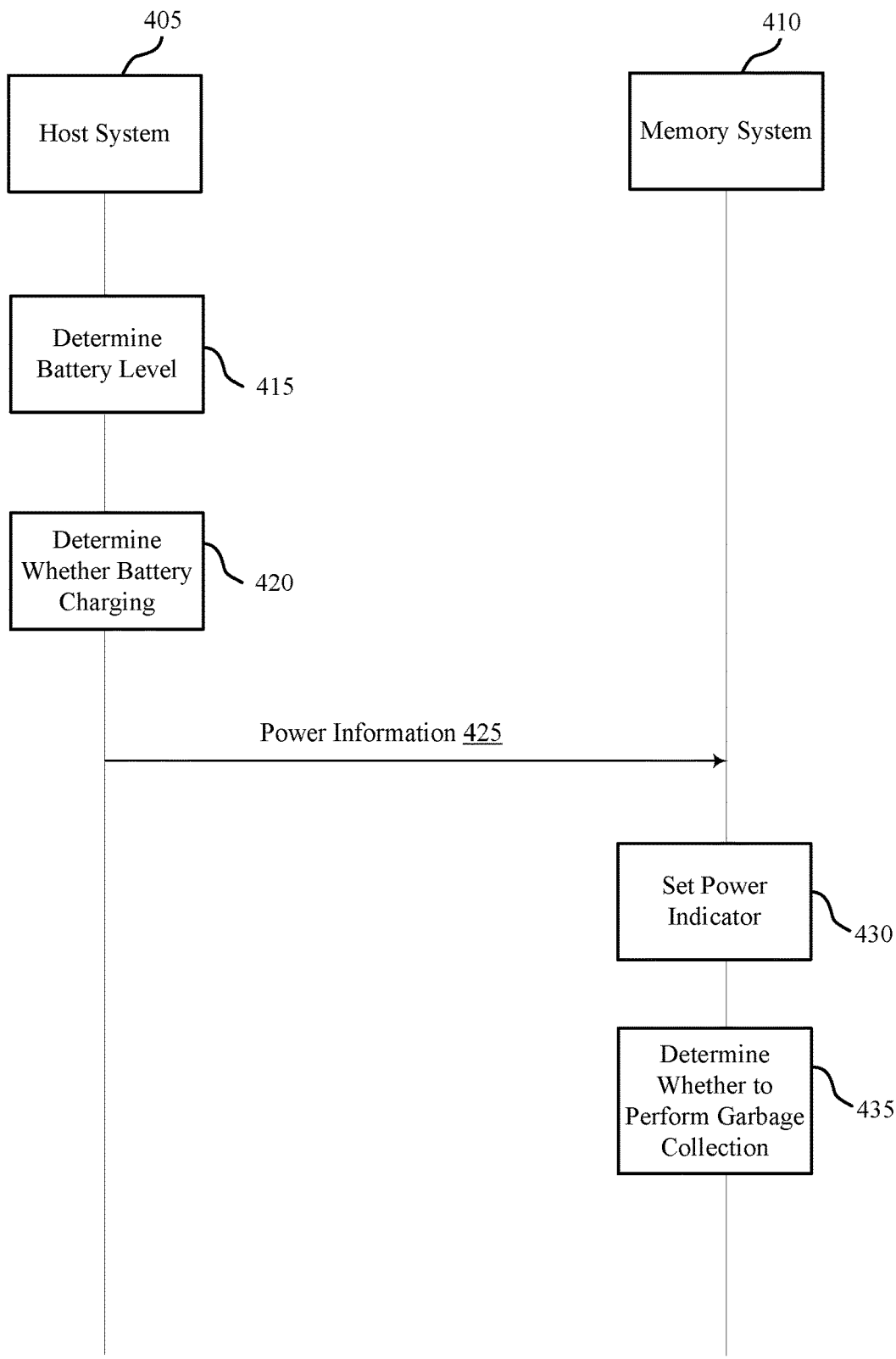
FIG. 4 illustrates an example of a flow diagram that supports selective garbage collection in accordance with examples as disclosed herein.

FIG. 4 illustrates an example of a flow diagram 400 that supports selective garbage collection in accordance with examples as disclosed herein. Flow diagram 400 may include host system 405 and memory system 410, which may be respective examples of a host system and memory system as described in reference to FIGS. 1-3. Alternative examples of the following may be implemented, where some steps are performed in a different order or not at all. Some steps may additionally include additional features not mentioned below.

Aspects of the flow diagram 400 may be implemented by a controller, among other components. Additionally or alternatively, aspects of the flow diagram 400 may be implemented as instructions stored in memory (e.g., firmware stored in a memory coupled with host system 105). For example, the instructions, when executed by a controller (e.g., the external memory controller 120), may cause the controller to perform the operations of the flow diagram 400. The flow diagram 400 illustrates techniques where the host system 405 may transmit information about the memory system to the memory system 410, and the memory system 410 may determine whether a garbage collection procedure is performed based on the received information.

At 415, a battery level may be determined. For example, the host system 405 may determine the battery level of the memory system that includes the memory system 410. The host system 405 may determine that the battery level is below a threshold. At 420, the host system 405 may determine whether the battery is charging. If the battery level is below the threshold and the battery is not charging, the host system 405 may determine that a power safe mode is on.

In other examples, the host system 405 may determine that the battery level is above the threshold. In such cases, the host system 405 may determine that the battery is currently charging or fully charged. If the battery level is above the threshold and the battery is fully charged or currently charging, the host system 405 may determine that the power safe mode is off.

The host system 405 may transmit, to the memory system 410, power information 425 associated with the power parameter. The power information 425 may include the battery level, whether the battery is currently charging, whether the system is coupled with a power source, an indication whether the battery level is above or below or threshold, or a combination thereof.

At 430, a power indicator may be set. For example, the memory system 410 may set the power indicator (e.g., a value of a flag). The memory system 410 may set the power indicator based on the power information 425. For example, the memory system 410 may set the value of the flag. The flag may indicate whether the power parameter of the memory system satisfies the criterion. The memory system 410 may store the value of the flag in a register associated with the memory system. For example, the memory system 410 may store the flag by a first register associated with the memory system. In some cases, the memory system 410 may set the value of the flag to a first value (e.g., "1") that indicates the power parameter satisfies the criterion or set the value of the flag to a second value (e.g., "0") that indicates the power parameter fails to satisfy the criterion.

At 435, a determination may be made whether performing a garbage collection procedure on the memory system 310 is permitted. For example, the memory system 410 may determine whether to perform the garbage collection procedure. The memory system 410 may use the power indicator to determine whether to perform the garbage collection procedure. In some examples, the memory system 410 may suspend the garbage collection procedure based on determining that the flag (e.g., power indicator) indicates that the battery level of the memory system is below a threshold. The memory system 410 may suspend the garbage collection procedure based on the battery level being below the threshold and the battery failing to currently be charging. In such cases, the value of the power indicator may be the first value.

In other examples, the memory system 410 may perform the garbage collection procedure based on determining that the flag indicates that the battery level of the memory system is above the threshold. The memory system 410 may perform the garbage collection procedure based on the battery level being above the threshold and the battery currently charging or fully charged. In such cases, the value of the power indicator may be the second value.

Figure 5:
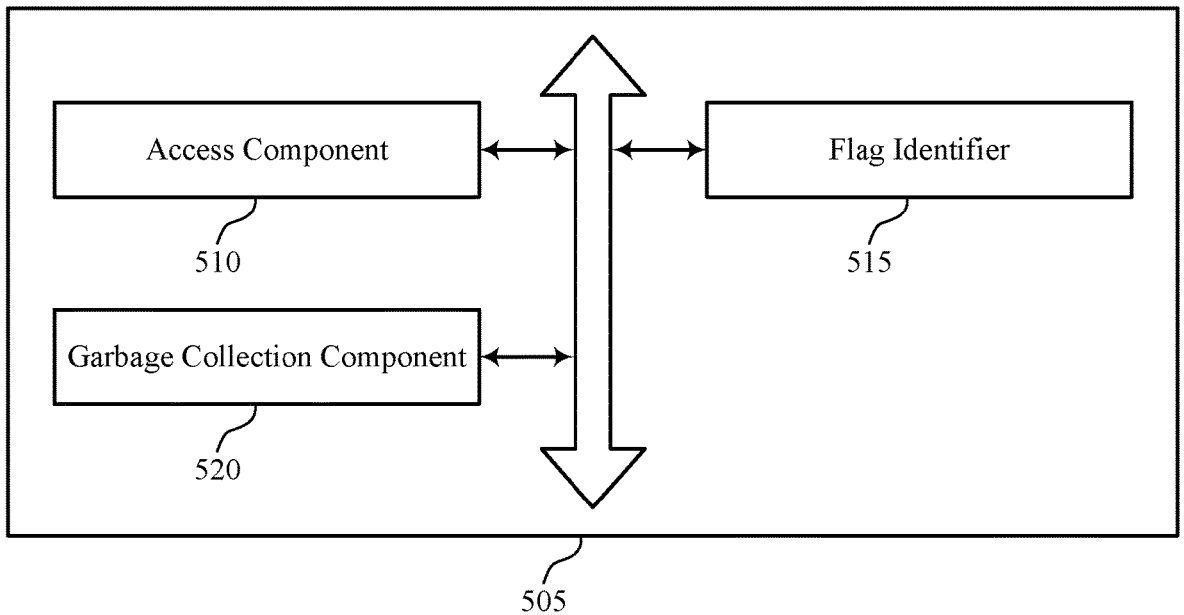
FIG. 5 shows a block diagram of a memory system that supports selective garbage collection in accordance with examples as disclosed herein.

FIG. 5 shows a block diagram 500 of a memory system 505 that supports selective garbage collection in accordance with examples as disclosed herein. The memory system 505 may be an example of aspects of a memory system as described with reference to FIGS. 1 through 4. The memory system 505 may include an access component 510, a flag identifier 515, and a garbage collection component 520. Each of these modules may communicate, directly or indirectly, with one another (e.g., via one or more buses).

The access component 510 may perform, by the memory device, an access operation. In some examples, the access component 510 may read a register associated with the memory device based on performing the access operation, where identifying the value of the flag is based on reading the register.

The flag identifier 515 may identify a value of a flag that indicates whether a power parameter of a system that includes the memory device satisfies a criterion based on performing the access operation. In some examples, the flag further indicates whether a battery of the system is currently charging, and where suspending the garbage collection procedure is based on the battery level being below the threshold and the battery failing to currently be charging. In some examples, the flag further indicates whether a battery of the system is currently charging of fully charged, and where performing the garbage collection procedure is based on the battery level being above the threshold and the battery currently charging or fully charged.

In some examples, the flag identifier 515 may identify a second value of a second flag that indicates whether the memory device is permitted to perform one or more garbage collection procedures, where determining whether performing the garbage collection procedure on the memory device is permitted based on the second value of the second flag and the value of the flag. In some cases, the flag is stored by a first register associated with the memory device. In some cases, the second flag is stored by a second register associated with the memory device. In some examples, the flag identifier 515 may determine that the flag indicates the power parameter satisfies the criterion and that the garbage collection procedure is restricted.

The garbage collection component 520 may determine whether performing a garbage collection procedure on the memory device is permitted based on identifying the value of the flag. In some examples, the garbage collection component 520 may suspend the garbage collection procedure based on determining that the flag indicates that a battery level of the system is below a threshold, where the power parameter includes the battery level and the criterion includes the threshold. In some examples, the garbage collection component 520 may perform the garbage collection procedure based on determining that the flag indicates that a battery level of the system is above a threshold.

In some examples, the garbage collection component 520 may transmit, to a host system, a request to perform the garbage collection procedure based on determining that the flag indicates the power parameter satisfies the criterion, where determining whether to perform the garbage collection procedure is based on transmitting the request. In some examples, the garbage collection component 520 may identify an idle period to perform the garbage collection procedure based on determining whether performing the garbage collection procedure is permitted.

Figure 6:
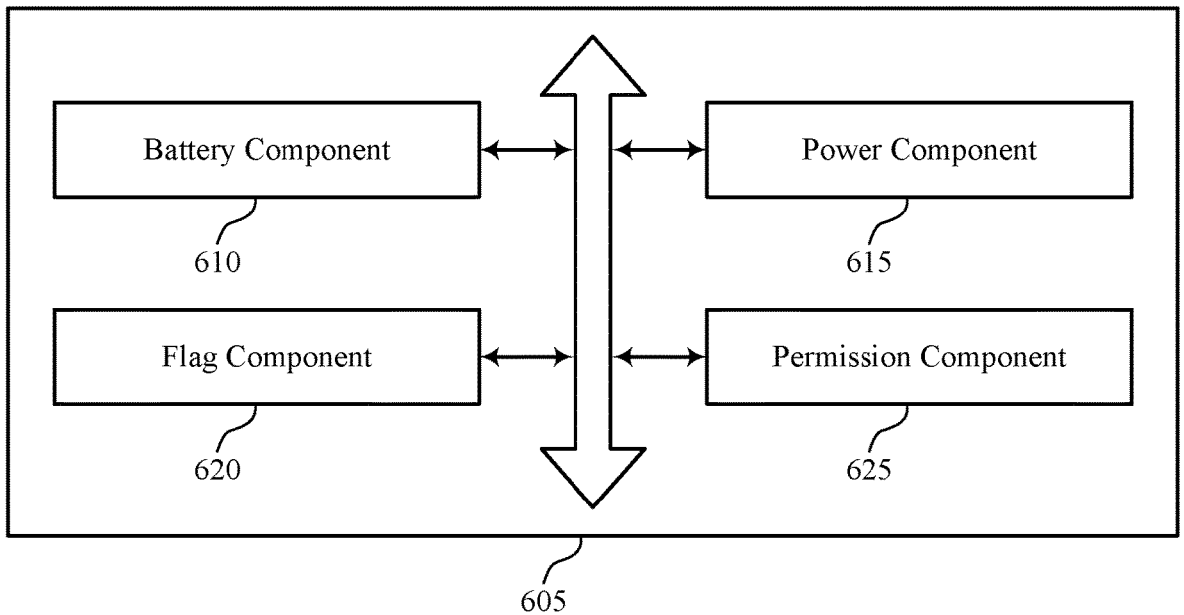
FIG. 6 shows a block diagram of a host system that supports selective garbage collection in accordance with examples as disclosed herein.

FIG. 6 shows a block diagram 600 of a host system 605 that supports selective garbage collection in accordance with examples as disclosed herein. The host system 605 may be an example of aspects of a host system as described with reference to FIGS. 1 through 4. The host system 605 may include a battery component 610, a power component 615, a flag component 620, and a permission component 625. Each of these modules may communicate, directly or indirectly, with one another (e.g., via one or more buses).

The battery component 610 may determine that a battery level of a system that includes the memory system is below a threshold. In some examples, the battery component 610 may determine whether a battery of the system is currently charging, where determining whether the power parameter satisfies the criterion is based on determining whether the battery of the system is currently charging.

The power component 615 may determine whether a power parameter of the system that includes the memory system satisfies a criterion based on determining that the battery level is below the threshold. In some examples, the power parameter satisfies the criterion based on determining that the battery level is below the threshold and determining that the battery of the system fails to currently be charging. In some examples, the power parameter fails to satisfy the criterion based on determining that the battery level is above the threshold and determining that the battery of the system is currently charging or fully charged.

The flag component 620 may set a value of a flag that indicates whether the power parameter of the system that includes the memory system satisfies the criterion based on determining whether the power parameter satisfies the criterion. In some examples, the flag component 620 may store the value of the flag in a register associated with the memory system and readable by the apparatus.

In some examples, the flag component 620 may set a second value of a second flag that indicates whether the memory system is permitted to perform the one or more garbage collection procedures. In some cases, the flag is stored by a first register associated with the memory system. In some cases, the second flag is stored by a second register associated with the memory system.

In some examples, the flag component 620 may set the value of the flag to a first value that indicates the power parameter satisfies the criterion. In some examples, the flag component 620 may set the value of the flag to a second value that indicates the power parameter fails to satisfy the criterion.

The permission component 625 may determine whether the memory system is permitted to perform one or more garbage collection procedures. In some examples, the permission component 625 may receive a request to perform a garbage collection procedure during at least a portion of an idle period that the value of the flag indicates that the power parameter satisfies the criterion and that one or more garbage collection procedures are restricted.

In some examples, the permission component 625 may transmit information from a host system permitting the garbage collection procedure based on receiving the request. In some examples, the permission component 625 may determine whether a priority of the request satisfies a second threshold based on receiving the request, where transmitting the information is based on determining whether the priority of the request satisfies the second threshold.

Figure 7:
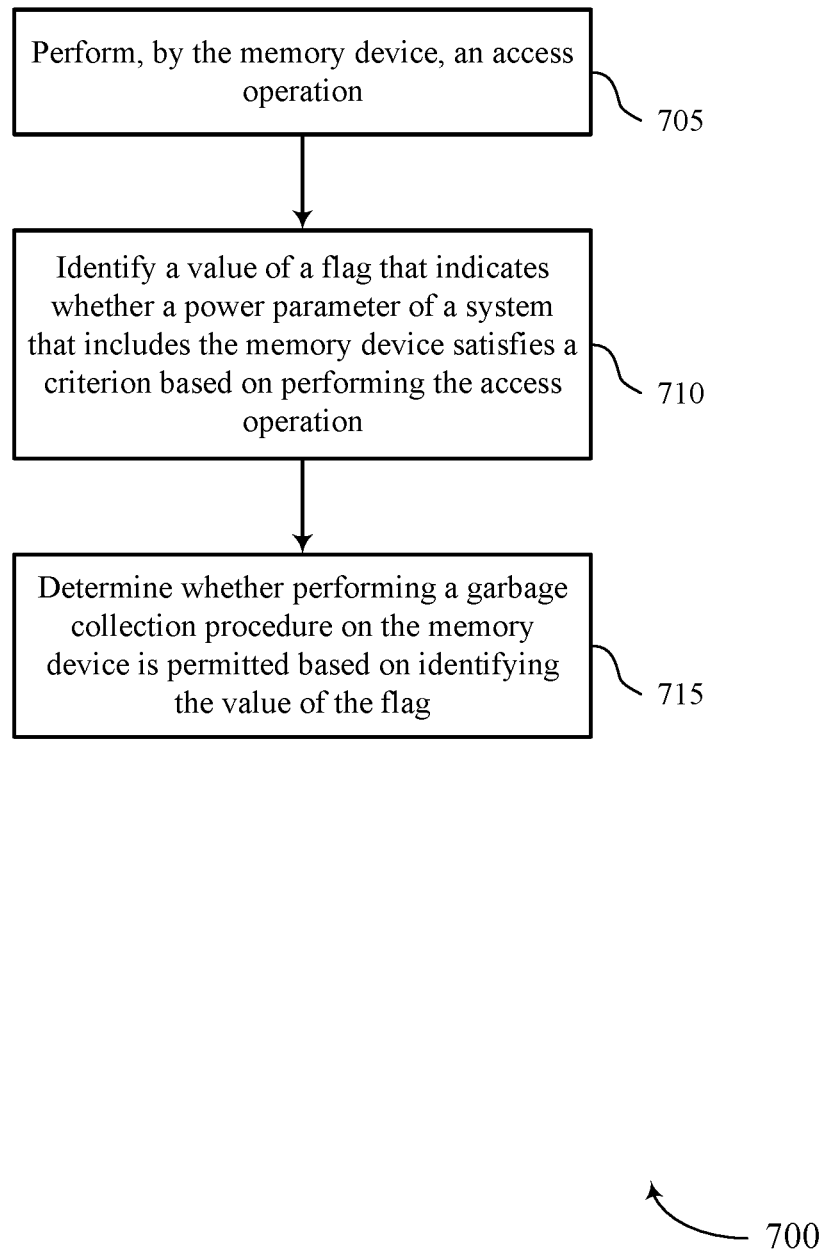
FIGS. 7 and 8 show flowcharts illustrating a method or methods that support selective garbage collection in accordance with examples as disclosed herein.

FIG. 7 shows a flowchart illustrating a method or methods 700 that supports selective garbage collection in accordance with examples as disclosed herein. The operations of method 700 may be implemented by a memory system or its components as described herein. For example, the operations of method 700 may be performed by a memory system as described with reference to FIG. 5. In some examples, a memory system may execute a set of instructions to control the functional elements of the memory system to perform the described functions. Additionally or alternatively, a memory system may perform aspects of the described functions using special-purpose hardware.

At 705, an access operation may be performed. For example, the memory system or the memory device may perform the access operation. The operations of 705 may be performed according to the methods described herein. In some examples, aspects of the operations of 705 may be performed by an access component as described with reference to FIG. 5.

At 710, a value of a flag may be identified. For example, the memory system or the memory device may identify the value of the flag that indicates whether a power parameter of a system that includes the memory device satisfies a criterion based on performing the access operation. The operations of 710 may be performed according to the methods described herein. In some examples, aspects of the operations of 710 may be performed by a flag identifier as described with reference to FIG. 5.

At 715, a determination whether performing a garbage collection procedure on the memory device is permitted may be determined. For example, the memory system or the memory device may determine whether performing the garbage collection procedure on the memory device is permitted based on identifying the value of the flag. The operations of 715 may be performed according to the methods described herein. In some examples, aspects of the operations of 715 may be performed by a garbage collection component as described with reference to FIG. 5.

In some examples, an apparatus as described herein may perform a method or methods, such as the method 700. The apparatus may include features, means, or instructions (e.g., a non-transitory computer-readable medium storing instructions executable by a processor) for performing, by the memory device, an access operation, identifying a value of a flag that indicates whether a power parameter of a system that includes the memory device satisfies a criterion based on performing the access operation, and determining whether performing a garbage collection procedure on the memory device is permitted based on identifying the value of the flag.

Some examples of the method 700 and the apparatus described herein may further include operations, features, means, or instructions for suspending the garbage collection procedure based on determining that the flag indicates that a battery level of the system may be below a threshold, where the power parameter includes the battery level and the criterion includes the threshold.

In some examples of the method 700 and the apparatus described herein, the flag further indicates whether a battery of the system may be currently charging, and where suspending the garbage collection procedure may be based on the battery level being below the threshold and the battery failing to currently be charging.

Some examples of the method 700 and the apparatus described herein may further include operations, features, means, or instructions for performing the garbage collection procedure based on determining that the flag indicates that a battery level of the system may be above a threshold.

In some examples of the method 700 and the apparatus described herein, the flag further indicates whether a battery of the system may be currently charging or fully charged, and where performing the garbage collection procedure may be based on the battery level being above the threshold and the battery currently charging or fully charged.

Some examples of the method 700 and the apparatus described herein may further include operations, features, means, or instructions for identifying a second value of a second flag that indicates whether the memory device may be permitted to perform one or more garbage collection procedures, where determining whether performing the garbage collection procedure on the memory device may be permitted based on the second value of the second flag and the value of the flag.

In some examples of the method 700 and the apparatus described herein, the flag may be stored by a first register associated with the memory device, and the second flag may be stored by a second register associated with the memory device.

Some examples of the method 700 and the apparatus described herein may further include operations, features, means, or instructions for determining that the flag indicates the power parameter satisfies the criterion and that the garbage collection procedure may be restricted, and transmitting, to a host system, a request to perform the garbage collection procedure based on determining that the flag indicates the power parameter satisfies the criterion, where determining whether to perform the garbage collection procedure may be based on transmitting the request.

Some examples of the method 700 and the apparatus described herein may further include operations, features, means, or instructions for reading a register associated with the memory device based on performing the access operation, where identifying the value of the flag may be based on reading the register.

Some examples of the method 700 and the apparatus described herein may further include operations, features, means, or instructions for identifying an idle period to perform the garbage collection procedure based on determining whether performing the garbage collection procedure may be permitted.

Figure 8:
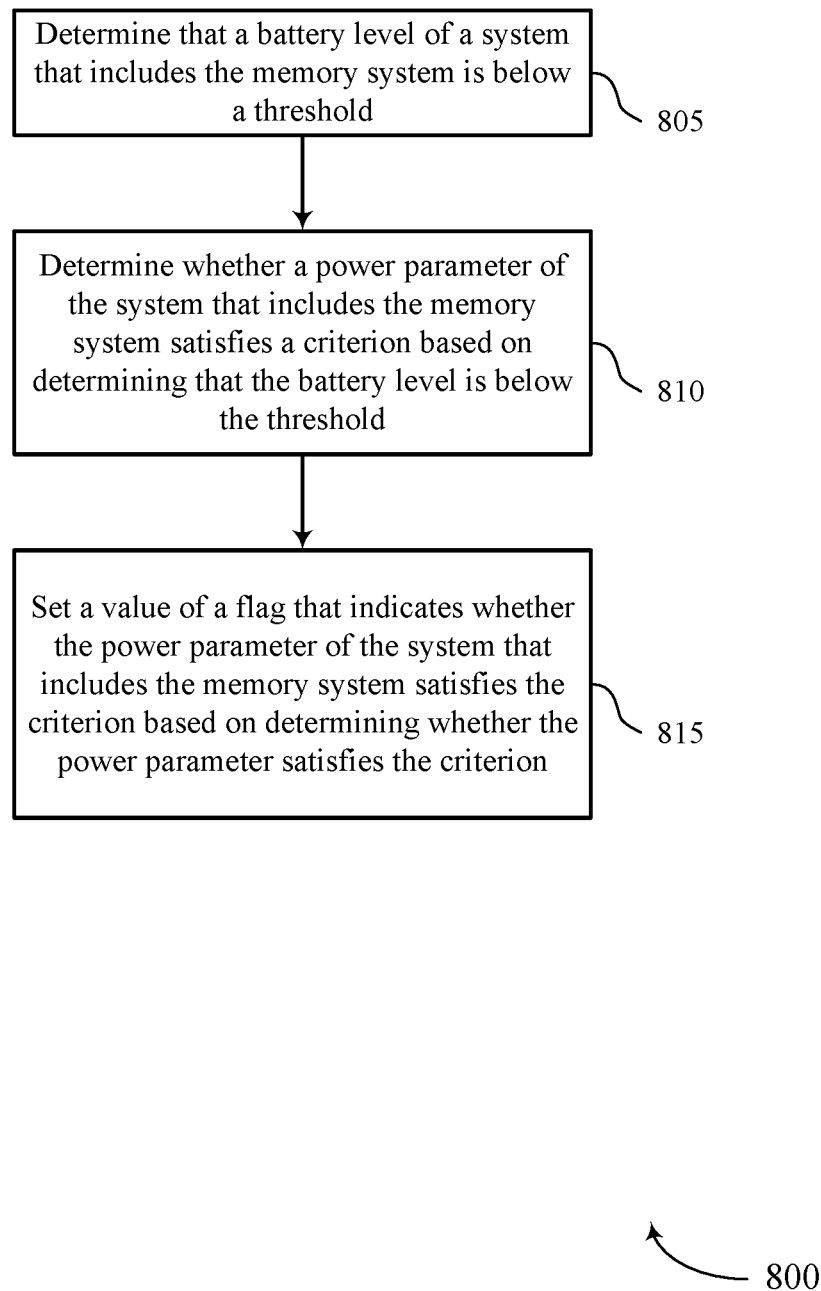

FIG. 8 shows a flowchart illustrating a method or methods 800 that supports selective garbage collection in accordance with examples as disclosed herein. The operations of method 800 may be implemented by a host system or its components as described herein. For example, the operations of method 800 may be performed by a host system as described with reference to FIG. 6. In some examples, a host system may execute a set of instructions to control the functional elements of the host system to perform the described functions. Additionally or alternatively, a host system may perform aspects of the described functions using special-purpose hardware.

At 805, a battery level may be determined. For example, the host system may determine that the battery level of a system that includes the memory system is below a threshold. The memory system may include one or more memory devices. The operations of 805 may be performed according to the methods described herein. In some examples, aspects of the operations of 805 may be performed by a battery component as described with reference to FIG. 6.

At 810, a power parameter may be determined. For example, the host system may determine whether the power parameter of the system that includes the memory system satisfies a criterion based on determining that the battery level is below the threshold. The operations of 810 may be performed according to the methods described herein. In some examples, aspects of the operations of 810 may be performed by a power component as described with reference to FIG. 6.

At 815, a value of a flag may be set. For example, the host system may set the value of the flag that indicates whether the power parameter of the system that includes the memory system satisfies the criterion based on determining whether the power parameter satisfies the criterion. The operations of 815 may be performed according to the methods described herein. In some examples, aspects of the operations of 815 may be performed by a flag component as described with reference to FIG. 6.

In some examples, an apparatus as described herein may perform a method or methods, such as the method 800. The apparatus may include features, means, or instructions (e.g., a non-transitory computer-readable medium storing instructions executable by a processor) for determining that a battery level of a system that includes a memory system is below a threshold, determining whether a power parameter of the system that includes the memory system satisfies a criterion based on determining that the battery level is below the threshold, and setting a value of a flag that indicates whether the power parameter of the system that includes the memory system satisfies the criterion based on determining whether the power parameter satisfies the criterion.

Some examples of the method 800 and the apparatus described herein may further include operations, features, means, or instructions for determining whether a battery of the system may be currently charging, where determining whether the power parameter satisfies the criterion may be based on determining whether the battery of the system may be currently charging.

In some examples of the method 800 and the apparatus described herein, the power parameter satisfies the criterion based on determining that the battery level may be below the threshold and determining that the battery of the system fails to currently be charging.

In some examples of the method 800 and the apparatus described herein, the power parameter fails to satisfy the criterion based on determining that the battery level may be above the threshold and determining that the battery of the system may be currently charging or fully charged.

In some examples of the method 800 and the apparatus described herein, setting the value of the flag may include operations, features, means, or instructions for storing the value of the flag in a register associated with the memory system and readable by the apparatus.

Some examples of the method 800 and the apparatus described herein may further include operations, features, means, or instructions for determining whether the memory system may be permitted to perform one or more garbage collection procedures, and setting a second value of a second flag that indicates whether the memory system may be permitted to perform the one or more garbage collection procedures.

In some examples of the method 800 and the apparatus described herein, the flag may be stored by a first register associated with the memory system, and the second flag may be stored by a second register associated with the memory system.

In some examples of the method 800 and the apparatus described herein, setting the value of the flag further may include operations, features, means, or instructions for setting the value of the flag to a first value that indicates the power parameter satisfies the criterion or setting the value of the flag to a second value that indicates the power parameter fails to satisfy the criterion.

Some examples of the method 800 and the apparatus described herein may further include operations, features, means, or instructions for receiving a request to perform a garbage collection procedure during at least a portion of an idle period that the value of the flag indicates that the power parameter satisfies the criterion and that one or more garbage collection procedures may be restricted, and transmitting information from a host system permitting the garbage collection procedure based on receiving the request.

Some examples of the method 800 and the apparatus described herein may further include operations, features, means, or instructions for determining whether a priority of the request satisfies a second threshold based on receiving the request, where transmitting the information may be based on determining whether the priority of the request satisfies the second threshold.

It should be noted that the methods described herein are possible implementations, and that the operations and the steps may be rearranged or otherwise modified and that other implementations are possible. Furthermore, portions from two or more of the methods may be combined.

An apparatus for method performed by a memory device is described. The apparatus may include a memory device and a controller coupled with the memory device. The controller may be configured to cause the apparatus to perform, by the memory device, an access operation, identify a value of a flag that indicates whether a power parameter of a system that includes the memory device satisfies a criterion based on performing the access operation, and determine whether performing a garbage collection procedure on the memory device is permitted based on identifying the value of the flag.

Some examples may further include suspending the garbage collection procedure based on determining that the flag indicates that a battery level of the system may be below a threshold, where the power parameter includes the battery level and the criterion includes the threshold.

In some examples, the flag further indicates whether a battery of the system may be currently charging, and where suspending the garbage collection procedure may be based on the battery level being below the threshold and the battery failing to currently be charging.

Some examples may further include performing the garbage collection procedure based on determining that the flag indicates that a battery level of the system may be above a threshold.

In some examples, the flag further indicates whether a battery of the system may be currently charging or fully charged, and where performing the garbage collection procedure may be based on the battery level being above the threshold and the battery currently charging or fully charged.

Some examples may further include identifying a second value of a second flag that indicates whether the memory device may be permitted to perform one or more garbage collection procedures, where determining whether performing the garbage collection procedure on the memory device may be permitted based on the second value of the second flag and the value of the flag.

In some examples, the flag may be stored by a first register associated with the memory device, and the second flag may be stored by a second register associated with the memory device.

Some examples may further include determining that the flag indicates the power parameter satisfies the criterion and that the garbage collection procedure may be restricted, and transmitting, to a host system, a request to perform the garbage collection procedure based on determining that the flag indicates the power parameter satisfies the criterion, where determining whether to perform the garbage collection procedure may be based on transmitting the request.

Some examples may further include reading a register associated with the memory device based on performing the access operation, where identifying the value of the flag may be based on reading the register.

Some examples may further include identifying an idle period to perform the garbage collection procedure based on determining whether performing the garbage collection procedure may be permitted.

An apparatus for method performed by a memory system is described. The apparatus may include a memory system comprising one or more memory devices and a controller coupled with the memory system. The controller may be configured to cause the apparatus to determine that a battery level of a system that includes the memory system is below a threshold, determine whether a power parameter of the system that includes the memory system satisfies a criterion based on determining that the battery level is below the threshold, and set a value of a flag that indicates whether the power parameter of the system that includes the memory system satisfies the criterion based on determining whether the power parameter satisfies the criterion.

Some examples may further include determining whether a battery of the system may be currently charging, where determining whether the power parameter satisfies the criterion may be based on determining whether the battery of the system may be currently charging.

In some examples, the power parameter satisfies the criterion based on determining that the battery level may be below the threshold and determining that the battery of the system fails to currently be charging.

In some examples, the power parameter fails to satisfy the criterion based on determining that the battery level may be above the threshold and determining that the battery of the system may be currently charging or fully charged.

Some examples may further include storing the value of the flag in a register associated with the memory system and readable by the apparatus.

Some examples may further include determining whether the memory system may be permitted to perform one or more garbage collection procedures, and setting a second value of a second flag that indicates whether the memory system may be permitted to perform the one or more garbage collection procedures.

In some examples, the flag may be stored by a first register associated with the memory system, and the second flag may be stored by a second register associated with the memory system.

Some examples may further include setting the value of the flag to a first value that indicates the power parameter satisfies the criterion or setting the value of the flag to a second value that indicates the power parameter fails to satisfy the criterion.

Some examples may further include receiving a request to perform a garbage collection procedure during at least a portion of an idle period that the value of the flag indicates that the power parameter satisfies the criterion and that one or more garbage collection procedures may be restricted, and transmitting information from a host system permitting the garbage collection procedure based on receiving the request.

Some examples may further include determining whether a priority of the request satisfies a second threshold based on receiving the request, where transmitting the information may be based on determining whether the priority of the request satisfies the second threshold.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals can be communicated between components over the conductive path. When a component, such as a controller, couples other components together, the component initiates a change that allows signals to flow between the other components over a conductive path that previously did not permit signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other cases, the substrate may be a silicon-on-insulator (SOI) substrate, such as silicon-on-glass (SOG) or silicon-on-sapphire (SOS), or epitaxial materials of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory device; and
   a controller coupled with the memory device and configured to cause the apparatus to:
      perform, by the memory device, an access operation to read a register associated with a system that includes the memory device;
      identify, from the register, a value of a flag that indicates whether a power parameter of the system that includes the memory device satisfies a criterion based at least in part on performing the access operation, wherein the power parameter comprises a battery level of the system and an indication of whether a battery of the system is currently charging; and
      determine whether performing a garbage collection procedure on the memory device is permitted based at least in part on identifying the value of the flag.

2. The apparatus of claim 1, wherein the controller is further configured to cause the apparatus to:
   suspend the garbage collection procedure based at least in part on determining that the flag indicates that the battery level of the system is below a threshold, wherein the criterion comprises the threshold.

3. The apparatus of claim 2, wherein suspending the garbage collection procedure is based at least in part on the battery level being below the threshold and the battery failing to currently be charging.

4. The apparatus of claim 1, wherein the controller is further configured to cause the apparatus to:
   perform the garbage collection procedure based at least in part on determining that the flag indicates that the battery level of the system is above a threshold.

5. The apparatus of claim 4, wherein performing the garbage collection procedure is based at least in part on the battery level being above the threshold and the battery currently charging or fully charged.

6. The apparatus of claim 1, wherein the controller is further configured to cause the apparatus to:
   identify a second value of a second flag that indicates whether the memory device is permitted to perform one or more garbage collection procedures, wherein determining whether performing the garbage collection procedure on the memory device is permitted based at least in part on the second value of the second flag and the value of the flag.

7. The apparatus of claim 6, wherein:
   the flag is stored by a first register associated with the memory device; and
   the second flag is stored by a second register associated with the memory device.

8. The apparatus of claim 1, wherein the controller is further configured to cause the apparatus to:
   determine that the flag indicates the power parameter satisfies the criterion and that the garbage collection procedure is restricted; and
   transmit, to a host system, a request to perform the garbage collection procedure based at least in part on determining that the flag indicates the power parameter satisfies the criterion, wherein determining whether to perform the garbage collection procedure is based at least in part on transmitting the request.

9. The apparatus of claim 1, wherein the controller is further configured to cause the apparatus to:
   read a register associated with the memory device based at least in part on performing the access operation, wherein identifying the value of the flag is based at least in part on reading the register.

10. The apparatus of claim 1, wherein the controller is further configured to cause the apparatus to:
    identify an idle period to perform the garbage collection procedure based at least in part on determining whether performing the garbage collection procedure is permitted.

11. The apparatus of claim 1, wherein the flag is a universal flash storage (UFS) flag or an embedded multimedia controller (eMNIC) flag.

12. An apparatus, comprising:
    a memory system; and
    a controller coupled with the memory system and configured to cause the apparatus to:
       determine that a battery level of a system that includes the memory system is below a threshold;
       determine whether a power parameter of the system that includes the memory system satisfies a criterion based at least in part on determining that the battery level is below the threshold;
       set, in a register associated with the system, a value of a flag that indicates whether the power parameter of the system that includes the memory system satisfies the criterion based at least in part on determining whether the power parameter satisfies the criterion, wherein the power parameter comprises the battery level of the system and an indication of whether a battery of the system is currently charging; and
       determine whether the memory system is permitted to perform one or more garbage collection procedures based at least in part on the value of the flag indicating whether the power parameter satisfies the criterion.

13. The apparatus of claim 12, wherein the power parameter satisfies the criterion based at least in part on determining that the battery level is below the threshold and determining that the battery of the system fails to currently be charging.

14. The apparatus of claim 12, wherein the power parameter fails to satisfy the criterion based at least in part on determining that the battery level is above the threshold and determining that the battery of the system is currently charging or fully charged.

15. The apparatus of claim 12, wherein, to set the value of the flag, the controller is configured to cause the apparatus to:
    store the value of the flag in a register associated with the memory system and readable by the apparatus.

16. The apparatus of claim 12, wherein the controller is further configured to cause the apparatus to:

set a second value of a second flag that indicates whether the memory system is permitted to perform the one or more garbage collection procedures.

17. The apparatus of claim 16, wherein:

the flag is stored by a first register associated with the memory system; and the second flag is stored by a second register associated with the memory system.

18. The apparatus of claim 12, wherein, to set the value of the flag, the controller is configured to cause the apparatus to:

set the value of the flag to a first value that indicates the power parameter satisfies the criterion; or set the value of the flag to a second value that indicates the power parameter fails to satisfy the criterion.

19. The apparatus of claim 12, wherein the controller is further configured to cause the apparatus to:

receive a request to perform a garbage collection procedure during at least a portion of an idle period that the value of the flag indicates that the power parameter satisfies the criterion and that one or more garbage collection procedures are restricted; and transmit information from a host system permitting the garbage collection procedure based at least in part on receiving the request.

20. The apparatus of claim 19, wherein the controller is further configured to cause the apparatus to:

determine whether a priority of the request satisfies a second threshold based at least in part on receiving the request, wherein transmitting the information is based at least in part on determining whether the priority of the request satisfies the second threshold.

21. A non-transitory computer-readable medium storing code comprising instructions, which when executed by a processor of an electronic device, cause the electronic device to:

perform, by a memory device, an access operation to read a register associated with a system that includes the memory device;

identify, from the register, a value of a flag that indicates whether a power parameter of the system that includes the memory device satisfies a criterion based at least in part on performing the access operation, wherein the power parameter comprises a battery level of the system and an indication of whether a battery of the system is currently charging; and determine whether performing a garbage collection procedure on the memory device is permitted based at least in part on identifying the value of the flag.

22. The non-transitory computer-readable medium of claim 21, wherein the instructions, when executed by the processor of the electronic device, further cause the electronic device to:

suspend the garbage collection procedure based at least in part on determining that the flag indicates that the battery level of the system is below a threshold, wherein the criterion comprises the threshold.

23. The non-transitory computer-readable medium of claim 22, wherein suspending the garbage collection procedure is based at least in part on the battery level being below the threshold and the battery failing to currently be charging.

24. The non-transitory computer-readable medium of claim 21, wherein the instructions, when executed by the processor of the electronic device, further cause the electronic device to:

perform the garbage collection procedure based at least in part on determining that the flag indicates that the battery level of the system is above a threshold.

25. The non-transitory computer-readable medium of claim 24, wherein performing the garbage collection procedure is based at least in part on the battery level being above the threshold and the battery currently charging or fully charged.

* * * * *